US012686647B2

(12) United States Patent (10) Patent No.: US 12,686,647 B2
Vogel-Martin et al. (45) Date of Patent: Jul. 21, 2026

(54) METAL-COATED ZIRCONIA ARTICLES

(71) Applicant: Solventum Intellectual Properties Company, Maplewood, MN (US)

(72) Inventors: Margaret M. Vogel-Martin, Forest Lake, MN (US); Jacqueline C. Rolf, River Falls, WI (US); Samuel R. Hei, White Bear Township, MN (US); Stephen A. O. Olson, Maplewood, MN (US)

(73) Assignee: Solventum Intellectual Properties Company, Eagan, MN (US)

( * ) Notice: Subject to any disclaimer, the term of this patent is extended or adjusted under 35 U.S.C. 154(b) by 0 days.

(21) Appl. No.: 18/724,138

(22) PCT Filed: Dec. 16, 2022

(86) PCT No.: PCT/IB2022/062395
§ 371 (c)(1),
(2) Date: Jun. 25, 2024

(87) PCT Pub. No.: WO2023/126757
PCT Pub. Date: Jul. 6, 2023

(65) Prior Publication Data
US 2025/0059103 A1 Feb. 20, 2025

Related U.S. Application Data

(60) Provisional application No. 63/294,107, filed on Dec. 28, 2021.

(51) Int. Cl.
| | |
|---|---|
| *C04B 41/90* | (2006.01) |
| *C04B 41/00* | (2006.01) |
| *C04B 41/52* | (2006.01) |

(52) U.S. Cl.
CPC ............ *C04B 41/90* (2013.01); *C04B 41/009* (2013.01); *C04B 41/52* (2013.01)

(58) Field of Classification Search
CPC ......... C23C 18/04; C23C 18/06; C23C 18/08; C23C 18/1851; C23C 18/18;
(Continued)

(56) References Cited

U.S. PATENT DOCUMENTS

| | | | |
|---|---|---|---|
| 4,865,877 A * | 9/1989 | Yamaguchi | ......... C04B 41/5353 |
| | | | 427/443.1 |
| 8,142,531 B2 | 3/2012 | Adefris et al. | |

(Continued)

FOREIGN PATENT DOCUMENTS

| | | |
|---|---|---|
| JP | S6335482 B2 | 7/1988 |
| WO | 2016140840 W | 9/2016 |
| WO | 2020099965 W | 5/2020 |

OTHER PUBLICATIONS

Adhesion of Silver Films to Ion-Bombarded Zirconia by R.A. Erck and G.R. Fenske in Lubrication Engineering, 1991, vol. 47-8, pp. 640-644.
(Continued)

*Primary Examiner* — Michael P Wieczorek

(57) ABSTRACT
Metal-coated zirconia articles have at least one surface that is a surface-treated surface. The surface-treated surface is a phosphate-treated surface. At least a portion of the surface-treated surface is covered with a layer of metal. The metal covering adheres more strongly to the surface-treated surface than to an identical surface that is not surface-treated.

16 Claims, 2 Drawing Sheets

(58) Field of Classification Search
CPC . C23C 18/1872; C23C 18/1882; C23C 18/31;
C23C 18/54; C23C 18/1893; C23C
14/0021; C23C 14/02; C23C 14/021;
C23C 14/24; C23C 14/34; C04B 41/88;
C04B 41/90; C04B 41/52; C04B 41/51;
C04B 41/5111; C04B 41/5116; C04B
41/009
See application file for complete search history.

(56)                      References Cited

U.S. PATENT DOCUMENTS

| | | | |
|---|---|---|---|
| 8,664,149 B2 | 3/2014 | Brady et al. | |
| 9,878,954 B2 | 1/2018 | Vogel-Martin et al. | |
| 10,550,627 B2 | 2/2020 | Vogel-Martin et al. | |
| 10,785,900 B2 * | 9/2020 | Ghosh | H01B 1/22 |
| 2016/0214903 A1 * | 7/2016 | Humpal | E06B 3/6612 |
| 2016/0369405 A1 * | 12/2016 | Bent | C23C 18/54 |
| 2023/0034846 A1 * | 2/2023 | Ludwig | A61B 5/259 |

OTHER PUBLICATIONS

International Search Report for PCT International Application No.
PCT/IB2022/062395 mailed on Mar. 22, 2023, 4 pages.

* cited by examiner

METAL-COATED ZIRCONIA ARTICLES

CROSS REFERENCE TO RELATED APPLICATIONS

This application is a national stage filing under 35 U.S.C. 371 of PCT/IB2022/062395, filed Dec. 16, 2022 which claims the benefit of U.S. Provisional Application No. 63/294,107, filed Dec. 28, 2021 the disclosure of which is incorporated by reference in its/their entirety herein.

SUMMARY

Disclosed herein are metal-coated zirconia articles and methods of preparing metal-coated zirconia articles.

In some embodiments, the metal-coated zirconia articles comprise a zirconia-containing article with at least one major surface, wherein at least a portion of the surface comprises a surface-treated surface, the surface-treated surface comprising a phosphate surface treated surface, and a layer of metal covering at least a portion of the surface-treated surface. The metal covering adheres more strongly to the surface-treated surface than to an identical surface that is not surface-treated.

Also disclosed are methods for preparing metal-coated zirconia articles. In some embodiments, the method of preparing a metal-coated article comprises providing a zirconia-containing article with at least one major surface, surface treating at least a portion of the at least one major surface of the article with a phosphate surface treatment to generate a phosphate-treated surface and disposing a layer of metal on at least a portion of the surface-treated surface.

BRIEF DESCRIPTION OF THE DRAWINGS

The present application may be more completely understood in consideration of the following detailed description of various embodiments of the disclosure in connection with the accompanying drawing.

Figure 1:
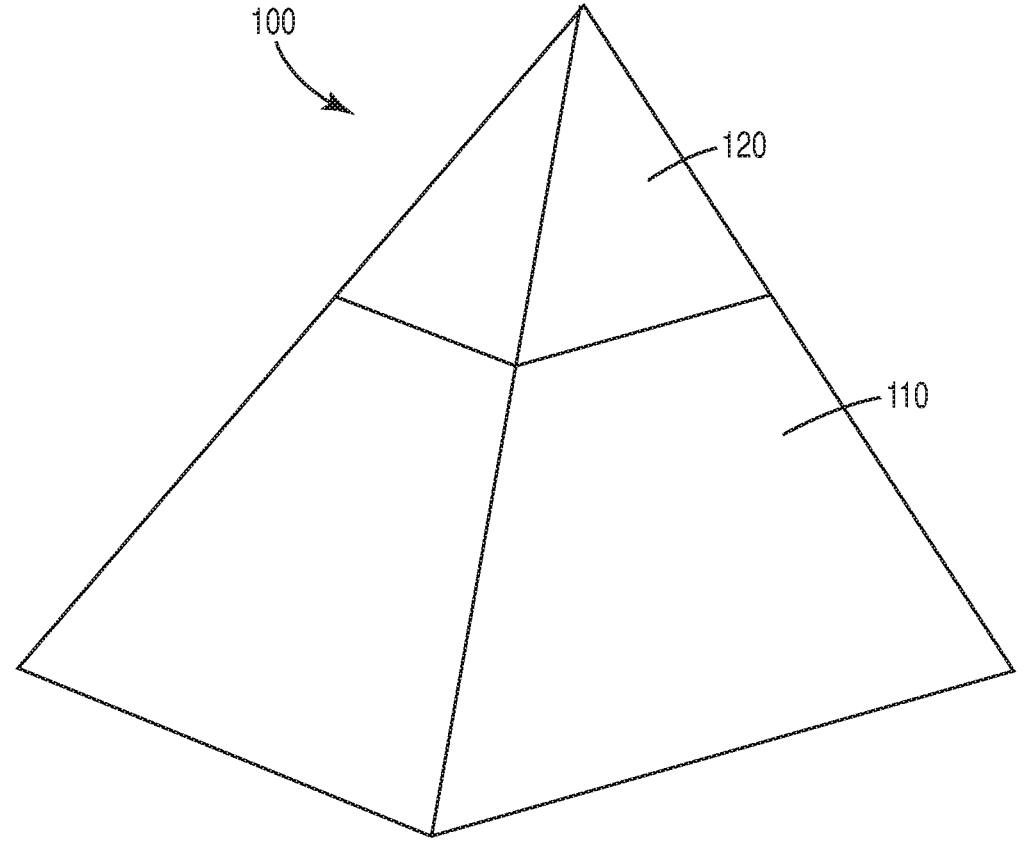
FIG. 1 is a top view of a metal-coated article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A wide range of articles can be prepared from zirconia. Examples of such articles are shaped non-compressive particles as well as a wide range of shaped articles. Shaped non-compressive particles are used in a wide range of applications. One recent application is the use of shaped non-compressive particles in electrodes. In this use, the particles are covered or at least partially covered with a conductive metal. Zirconia particles are difficult to coat with a conductive metal by conventional coating techniques.

One technique that has been explored for coating a metal such as silver onto zirconia substrates is described in "Adhesion of Silver Films to Ion-Bombarded Zirconia" by R. A. Erck and G. R. Fenske in *Lubrication Engineering,* 1991, Volume 47-8, pp. 640-644. In this report, the adhesion of silver layers to zirconia substrates is increased by using ion bombardment or a combination of ion bombardment and a thin interlayer of chromium or titanium. The use of these techniques is not suitable for widescale production of metal-coated articles, and in particular the use of a chromium interlayer is problematic in medical articles that are designed to contact human skin. Additionally, these techniques are difficult or impossible to utilize with small zirconia particles. Therefore, a need remains for a convenient, efficient and cost-effective method for the preparation of zirconia-containing articles, especially particles, with a metal coating. Disclosed herein are such methods for preparing metal-coated zirconia particles.

As mentioned above, non-compressive particles, especially metal-coated non-compressive particles are useful in a wide range of applications, especially in electrodes. Among the electrodes that such particles have been found to be particularly used are so-called "dry electrodes" as described in for example, PCT Publication No. 2020/099965.

Electrodes for measuring biopotential are used extensively in modern clinical and biomedical applications. The applications encompass numerous physiological tests including electrocardiography (ECG), electroencephalography (EEG), electrical impedance tomography (EIT), electromyography (EMG), and electro-oculography (EOG). The electrodes for these types of physiological tests function as a transducer by transforming the electric potential or biopotentials within the body into an electric voltage that can be measured by conventional measurement and recording devices.

In general, such electrodes are attached to the surface of the skin. A difficulty with electrodes placed on the surface of the skin is that the outer layer of skin, the stratum corneum, lacks moisture, and this lack of moisture gives high impedance. This high impedance results from the lack of ion mobility due to the lack of moisture in the stratum corneum.

Electrical conduction in the body is based on the movement of ions rather than the movement of electrons as found in metallic conductors. In order to register an electronic signal from the body an electrode must transform ionic conduction to electronic conduction. The vast majority of electrodes available today achieve this transduction through the use of silver/silver chloride reduction/oxidation reactions. A hydrogel containing $Ag^+$ and $Cl^-$ ions adjacent to the skin wets the stratum corneum and enables ion mobility between the skin and the electrode. Transduction occurs within the electrode at the interface of the hydrogel and an electronically conducting material (typically a metal snap or layer of conductive carbon composite). The conducting material is coated with silver, enabling the following reversible reactions and thus the detection of electrical pulses within the body.

$$Ag^+ + e^- \rightleftharpoons Ag(s)$$

$$AgCl(s) + e^- \rightleftharpoons Ag(s) + Cl^-$$

One difficulty with the use of hydrogel-containing electrodes is that the water in the hydrogel is subject to evaporation. Therefore, when in use the hydrogel can lose water and become ineffective. Additionally, the loss of water from the hydrogel as the electrode is stored and transported is a significant challenge. In order to prevent water loss from the hydrogel prior to its use, often expensive packaging, such as foil-lined envelopes, are used to increase the limited shelf life of such electrodes.

Therefore, considerable effort has been expended to the development of "dry." electrodes that do not utilize hydrogels. To make dry electrodes, many attempts have focused on an alternative to using a hydrogel to hydrate the dry stratum corneum, which is to use small structures to penetrate the stratum corneum and access the more moisture-rich layers of skin that lie beneath. Generally, the structures are coated with materials that will form a reduction/oxidation couple (typically silver and silver chloride) when in the presence of moisture. Examples of such small structures that have been used include microneedles or similar small, pointed structures to penetrate the stratum corneum to deeper layers of the skin with more moisture where ions are more mobile, enabling conduction.

The methods of manufacturing these electrodes, typically involve injection molding or other similar processes with subsequent coating of the formed microneedle structures with the redox couple are labor intensive, relatively high cost processes. These manufacturing issues have limited dry electrodes to niche markets. Therefore, new processes for preparing dry electrodes in an economical way to permit these electrodes to compete in the marketplace with the relatively easily produced wet electrodes are needed.

In this disclosure, articles are described that comprise metal-coated zirconia-containing articles, where the articles comprise a phosphate surface treated surface with a metal coating on the surface-treated surface. The metal adheres more strongly to the surface-treated surface than to an identical non-surface-treated surface. In many embodiments, the metal-coated articles comprise shaped non-compressive particles that are zirconia-containing. Also disclosed are methods of preparing these metal-coated articles, particularly metal-coated shaped non-compressive particles suitable for use in producing dry electrodes.

As used herein, the terms "shaped abrasive particle" and "shaped particle" are used interchangeably and refer to ceramic particles that can be used as abrasive particles with at least a portion of the particle having a predetermined shape that is replicated from a mold cavity used to form the shaped precursor particle. The shaped particle will generally have a predetermined geometric shape that substantially replicates the mold cavity that was used to form the shaped particle. Shaped particles as used herein excludes abrasive particles obtained by a mechanical crushing operation.

As used herein, the term "non-compressive" when referring to a particle refers to non-porous ceramic particles that have a compressive strength of greater than 400 MPa (megaPascals). In some embodiments, the particles have a compressive strength of greater than 600 MPa, 800 MPa, 1 GPa, or even 2 GPa.

The terms "room temperature" and "ambient temperature" are used interchangeably to mean temperatures in the range of 20° C. to 25° C.

The term "adjacent" as used herein when referring to two layers means that the two layers are in proximity with one another with no intervening open space between them. They may be in direct contact with one another (e.g. laminated together) or there may be intervening layers.

The term "zirconia-based" refers to particles or articles that may contain only zirconia (that is to say zirconium oxide), or they may optionally include other materials such as other metal oxides. If they contain other materials, zirconia is present in an amount of at least 50% by weight, more typically at least 70% by weight. The term "zirconia-containing" as used herein refers to articles that are zirconia-based.

Disclosed herein are metal-coated articles comprising a zirconia-containing article with at least one major surface, wherein at least a portion of the surface comprises a surface-treated surface, the surface-treated surface comprising a phosphate surface treated surface; and a layer of metal covering at least a portion of the surface-treated surface. The metal coating adheres more strongly to the surface-treated surface than to an identical surface that is not surface-treated.

A wide variety of metal-coated zirconia-containing articles are suitable. In many embodiments, the zirconia-containing article comprises non-compressive shaped zirconia-containing particles. While a wide range of non-compressive shaped zirconia-containing particles are suitable, in many embodiments the non-compressive shaped zirconia-containing particles comprise at least one point. Examples of suitable particles include particles prepared by methods used to make shaped abrasive particles, and the particles can have a wide variety of shapes including shapes such as a caltrops. The particles are non-compressive, meaning that they have a compression strength of greater than 400 MPa, 600 MPa, 800 MPa, 1 GPa, or even 2 GPa.

While a wide range of sizes and shapes are suitable for the shaped particles, at least one dimension of the shaped particles is 175-1,500 micrometers. In some embodiments, at least one dimension of the shaped particles is 175-750 micrometers or even 200-600 micrometers.

In some embodiments, the non-compressive shaped particles comprise ceramic shaped particles. Examples of suitable ceramic shaped particles are shaped abrasive particles with a sloping sidewall as described in U.S. Pat. No. 8,142,531. The steps of making the shaped particles are known in the art. Shaped abrasive particles are particularly desirable for use in forming the articles of this disclosure since they can be mass produced with known technologies and coated with an electrically conductive coating to form particles with at least one point, as will be described below. These pointed, electrically conductive particles, when formed into a dry electrode, are non-compressive and are capable of penetrating the stratum corneum.

The formation of zirconia-containing shaped particles has been described, for example in PCT Publication No. WO 2016/140840 and U.S. Pat. Nos. 9,878,954 and 10,550,627. The multi-step process for forming the zirconia-containing shaped particles is briefly summarized below.

Typically, the method of making the zirconia-containing particles includes (a) providing a mold having a mold cavity, (b) positioning a reaction mixture within the mold cavity, (c) polymerizing the reaction mixture to form a shaped gel body that is in contact with the mold cavity, (d) removing the shaped gel body from the mold cavity, wherein the shaped gel body retains a size and shape substantially identical to the mold cavity, (e) forming a dried shaped gel body by removing the solvent medium, (f) heating the dried shaped gel body to form a sintered body.

The reaction mixture used to form the shaped gel articles include (a) zirconia-based particles, (b) a solvent medium that includes an organic solvent having a boiling point equal to at least 150° C., (c) polymerizable material that includes a first surface modification agent having a free radical polymerizable group, and (d) a photoinitiator for a free radical polymerization reaction.

As mentioned above, zirconia-based particles may include other metal oxide particles besides zirconium oxide particles. Up to 30 mole percent of the zirconia-based particles can be $Y_2O_3$, $La_2O_3$, $Al_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Fe_2O_3$, $MnO_2$, $Co_2O_3$, $Cr_2O_3$, NiO, CuO, $V_2O_3$, $Bi_2O_3$, $Ga_2O_3$, $Lu_2O_3$, $HfO_2$, or mixtures thereof.

The solvent medium may contain water and also contains at least 60 weight percent of an organic solvent having a boiling point equal to at least 150° C. In some embodiments, the solvent medium contains at least 70 weight percent, at least 80 weight percent, at least 90 weight percent, at least 95 weight percent, at least 97 weight percent, at least 98 weight percent, or at least 99 weight percent of the organic solvent having a boiling point equal to at least 150° C.

The organic solvent is often a glycol or polyglycol, mono-ether glycol or mono-ether polyglycol, di-ether glycol or di-ether polyglycol, ether ester glycol or ether ester polyglycol, carbonate, amide, or sulfoxide (e.g., dimethyl sulfoxide). The organic solvents usually have one or more polar groups. The organic solvent does not have a polymerizable group: that is, the organic solvent is free of a group that can undergo free radical polymerization. Further, no component of the solvent medium has a polymerizable group that can undergo free radical polymerization.

The reaction mixture includes one or more polymerizable materials that have a polymerizable group that can undergo free radical polymerization (i.e., the polymerizable group is free radical polymerizable). In many embodiments, the polymerizable group is an ethylenically unsaturated group such as a (meth)acryloyl group, which is a group of formula: $—(CO)—CR^b—CH_2$ where Rb is hydrogen or methyl. In some embodiments, the polymerizable group is a vinyl group ($—CH=CH_2$) that is not a (meth)acryloyl group. The polymerizable material is usually selected so that it is soluble in or miscible with the organic solvent having a boiling point equal to at least 150° C.

The reaction mixture used to form the gel composition contains a photoinitiator. The reaction mixtures advantageously are initiated by application of actinic radiation. That is, the polymerizable material is polymerized using a photoinitiator rather than a thermal initiator. Surprisingly, the use of a photoinitiator rather than a thermal initiator tends to result in a more uniform cure throughout the gel composition ensuring uniform shrinkage in subsequent steps involved in the formation of sintered articles. In addition, the outer surface of the cured part is more uniform and more defect free when a photoinitiator is used rather than a thermal initiator.

A wide range of photoinitiators are known in the art. Some exemplary photoinitiators are benzoin ethers (e.g., benzoin methyl ether or benzoin isopropyl ether) or substituted benzoin ethers (e.g., anisoin methyl ether). Examples of suitable commercially available photoiniators include IRGACURE 651, ESACURE KB-1 IRGACURE 184, IRGACURE 819, IRGACURE 2959, IRGACURE 369, IRGACURE 907, and DAROCUR 1173.

Polymerization of the reaction mixture occurs upon exposure to ultraviolet and/or visible radiation and results in the formation of a gel composition, which is a polymerized (cured) product of the reaction mixture. The gel composition is a shaped gel article having a shape that is the same as the mold (e.g., the mold cavity). The gel composition is a solid or semi-solid matrix with liquid entrapped therein. The solvent medium in the gel composition is mainly the organic solvent having a boiling point equal to at least 150° C. The shaped gel article is stable and sufficiently strong to withstand drying and sintering.

After polymerization, the shaped gel article is removed from the mold cavity and the shaped gel article is treated to remove the organic solvent having a boiling point equal to at least 150° C. and any other organic solvents or water that may be present. This can be referred to as drying the gel composition or the shaped gel article regardless of the method used to remove the organic solvent. Any desired drying temperature up to 200° C. can be used. A xerogel results from this process of organic solvent removal.

After removal of the solvent medium, the resulting xerogel is heated to remove the polymeric material or any other organic material that may be present and to build strength through densification. The temperature is often raised as high as 1000° C. or 1100° C. during this process. This process is generally called "organic burnout".

After organic burnout the article is sintered. Sintering typically occurs at a temperature greater than 1100° C. such as, for example, at least 1200° C., at least 1250° C., at least 1300° C., or at least 1320° C. The rate of heating can typically be quite rapid such as at least 100° C./hour, at least 200° C./hour, at least 400° C./hour, or at least 600° C./hour. The temperature can be held for any desired time to produce sintered articles having the desired density. In some embodiments, the temperature is held for at least 1 hour, at least 2 hours, or at least 4 hours. The temperature can be held for 24 hours or even longer, if desired.

The resultant particles are non-porous crystalline particles with a density that is at least 98.5, 99, 99.5, 99.9, or even 99.99% of the theoretical density.

As mentioned above, the zirconia-containing articles are surface treated to enhance the adhesion of metal to the surface of the zirconia-containing articles. This surface treatment is a phosphate surface treatment. The surface treatment can be applied to the entire surface of the zirconia-containing article, or only to a portion of the zirconia-containing article as long as the portion of the zirconia-containing article that is to be coated with metal is surface treated.

The surface treatment is a phosphate surface treatment, meaning that the surface treatment agent is a phosphate. The surface treatment is carried out by surface treating the surface of the zirconia-containing article with a solution of phosphoric acid, phosphate salts, or a combination thereof. Examples of phosphate salts include, for example sodium phosphate, potassium phosphate and ammonium phosphate. The surface treatment may be carried out by immersing the article in the surface treatment solution, or the surface treatment solution may be applied to the article surface. Typically, after applying the surface treatment solution, the surface of the article is rinsed with water or an aqueous solution to remove excess surface treatment agent. After rinsing, the article may be dried, either by air drying or by the application of heat, for example by placing the article in an oven.

The metal-coated articles of this disclosure also contain a metal coating. The coating may cover the entire zirconia-containing article or as is more typical, only a portion of the zirconia-containing article. Examples of suitable metal include silver, copper, zinc, gold, aluminum, iron or nickel or alloys thereof. Typically, the metal coating is electrically conductive, especially in those embodiments where the articles are to be used as electrodes. While a range of electrically conductive metals are possible, silver is a particularly suitable metal. A wide range of thicknesses are suitable. Typically, the metal coating has a thickness of 20 nanometers-2 micrometers.

A wide variety of methods can be used to apply the metal coating to the articles that have been surface treated. Among the methods are chemical deposition methods, vapor deposition methods, or a combination of methods.

In some embodiments, the metal coating is produced by chemical deposition. Chemical deposition can be carried out in a variety of ways. In some embodiments, a metal salt is deposited on the surface of the surface-treated article and is the metal coating is then formed by thermal reduction of the metal salt. In this method, typically the surface-treated article is immersed in a solution of a metal salt such as $AgNO_3$. The article can be removed from the metal salt solution, optionally rinsed and/or dried and be heated to an elevated temperature to induce thermal reduction of metal salt on the surface. In the example of $AgNO_3$, the article can be heated to a temperature of 400° C. for 30 minutes In other variations, the method of disposing a layer of metal on at least a portion of the surface-treated surface comprises a deposition of metal from a metal solution by a chemical reduction reaction. When the metal is silver, this chemical reduction can be carried out using the Tollens reaction. The Tollens reaction is the mechanism of the Tollens Test for Aldehydes, also known as the Silver Mirror test. The test involves determining whether a solution contains an aldehyde by contacting it to a solution containing silver (I) ions. The aldehyde reduces the $Ag^+$ ion to silver metal and is itself oxidized to a carboxylic acid. When this test is carried out in the presence of the surface-treated surface, the silver metal forms a layer on the surface.

In some embodiments, the metal layer is disposed on the surface of the surface-treated zirconium-containing article by PVD (physical vapor deposition). Examples of suitable PVD methods include sputter coating and other evaporative deposition techniques such as are described in U.S. Pat. No. 8,664,149. These processes are well understood in the art and can generate coatings with a wide range of thicknesses.

As mentioned above, in some embodiments, the metal-coated shaped particles can be used as an electrode. In these embodiments, additional steps may be carried out to facilitate the use of the article as an electrode. In some embodiments, the conductive metal coating may be a multi-layer coating, for example a conductive metal coating may cover the entire or essentially the entire surface of the shaped particles, and a secondary coating, such as a silver coating or a silver/silver chloride coating, may be selectively coated over all or a portion of the first conductive metal coating. In some embodiments, the metal-coated particles comprise particles that are entirely coated with silver, and a portion of this coating is converted to a silver/silver chloride coating or a portion of the silver coating could be overcoated with a silver chloride coating.

Also disclosed herein are method of preparing metal-coated articles. In some embodiments, the methods comprise providing a zirconia-containing article with at least one major surface, surface treating at least a portion of the at least one major surface of the article with a phosphate surface treatment to generate a phosphate-treated surface and disposing a layer of metal on at least a portion of the surface-treated surface.

Suitable zirconia-containing articles, methods of surface treatment and disposing a layer of metal on the surface-treated surface has been described above. As mentioned above, in some embodiments, the zirconium-containing article comprises non-compressive shaped zirconia-containing particles, typically ones that comprise at least one point and at least one dimension is 175-1,500 micrometers. In some embodiments, at least one dimension of the shaped particles is 175-750 micrometers or even 200-600 micrometers. While a wide range of metals are suitable, in many embodiments the metal comprises silver and the metal coating is electrically conductive.

The current disclosure may be more fully understood from the Figures. In FIG. 1, article 100 is a non-compressive shaped zirconia-containing particle. The particle has phosphate surface-treatment layer 110, and metal coating layer 120. In this embodiment, the phosphate surface-treatment layer 110 is shown as covering the entire surface of article 100, and metal coating layer 120 is shown to only partially overlay the phosphate surface-treatment layer 110.

Figure 2:
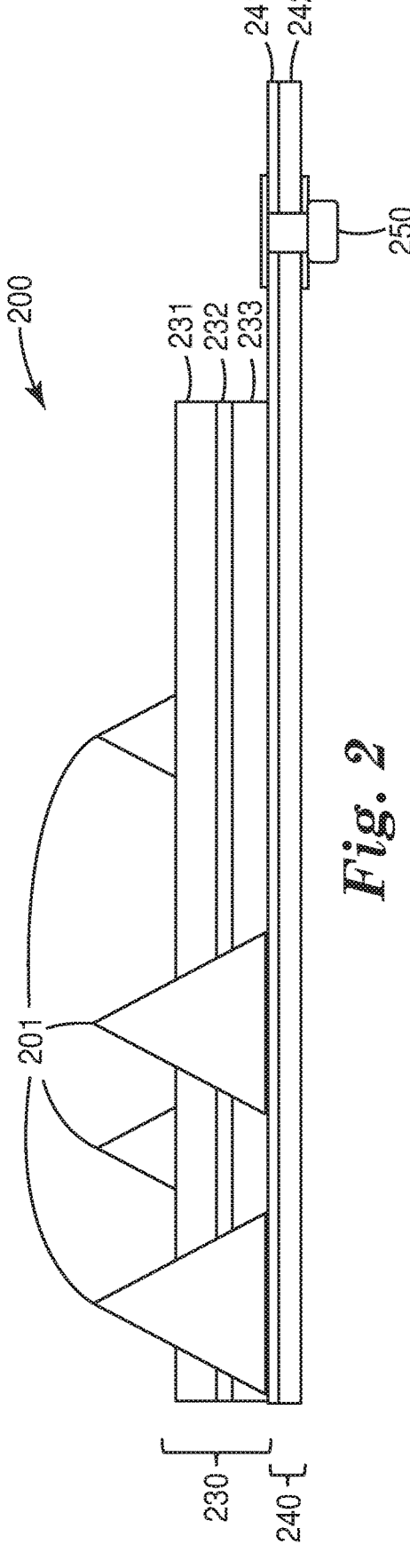
FIG. 2 is cross-sectional view of a dry electrode incorporating metal-coated particles of this disclosure.

FIG. 2 shows one embodiment of a dry electrode that utilizes a metal-coated non-compressive shaped zirconia-containing particle of this disclosure. In FIG. 2, dry electrode 200 has conductive particles 201, supporting layer 230 which has 3 sublayers 231, 232, 233 where 231 and 233 are adhesive layers and 232 is a film layer. Layer 240 is a conductive substrate which includes conductive layer 241 and optional film layer 242. Electrical connector 250 is in electrical contact with the conductive substrate 240.

EXAMPLES

These examples are merely for illustrative purposes only and are not meant to be limiting on the scope of the appended claims. All parts, percentages, ratios, etc. in the examples and the rest of the specification are by weight, unless noted otherwise. The following abbreviations are used: cm=centimeters; in=inches; mm=millimeters; sccm=standard cubic centimeters per minute. The terms "weight %", "% by weight", and "wt %" are used interchangeably.

Test Methods

Silver Layer Adhesion Test

The adhesion of a layer of silver deposited on a zirconia surface was tested using tapes. The tape was applied and pressed with hand pressure to adhere it to the silver deposited surface. The tape is then removed, and the amount of silver removed is noted. Three tapes are used in the test, chosen for their different levels of adhesion: SCOTCH #600 transparent tape adhesive, 3M 8403 HD adhesive, and POST-IT notes (all products of 3M Company, St. Paul, MN).

Tollens Reaction Description

The Tollens reaction works through the reduction of a silver ions by an aldehyde. In the solution used for this procedure the silver ion is obtained by dissolving silver nitrate into a water solution containing ammonium hydroxide. The solution was then agitated until all the silver nitrate was dissolved and becomes clear again. The reducing agent (aldehyde) in this experiment is obtained by dissolving sugar into water. When the two solutions are added together the aldehyde is oxidized by the Tollens solution, forming a carboxylate. The carboxylate is then reduced by the positive silver ion, resulting is solid silver to form in the solution.

Examples

A. Tollens Reaction Examples

Example 1 and Comparative Example CE1: Zirconia Disc

Example 1: Zirconia Disc Treatment with Phosphoric Acid a. Surface Treatment of Zirconia Disc:

A sintered zirconia disc was coated with dental phosphoric acid (SCOTCHBOND Universal Etchant, 3M) and rinsed with deionized (DI) water after 30 seconds. The disc was dried and then immersed in $AgNO_3$ solution (Alfa Aesar, Haverhill, MA) overnight. The disc was then placed into a BLUE-M furnace and dried at 80° C. After drying, the disk was heated to 400° C. in a THERMOLYNE 1200 (VWR International, LLC, Radnor, PA) to induce the thermal reduction of $AgNO_3$ to Ag. A slight color change of the disc surface was observed. The treated disc (Example 1) was treated further using the Tollens reaction.

Comparative Example CE1: Zirconia Disc with No Surface Treatment a. Surface Treatment of Zirconia Disc:
For Comparative Example CE1, no surface treatment was carried out. The untreated disc (Comparative Example CE1) was treated further using the Tollens reaction.
b. Formation of a Silver Layer by the Tollens Reaction:
A conductive silver seed-layer was deposited on each surface using the Tollens reaction. The discs were submerged into an aqueous solution of 0.58 wt % silver nitrate ($AgNO_3$ crystals, RQ, Ames Goldsmith, Elkton, Maryland), 1.18 wt % ammonium hydroxide (VWR ACS grade ammonium hydroxide, 28-30%, Radnor, Pennsylvania), and 0.26 wt % potassium hydroxide (≥85% pellets, Honeywell, Charlotte, North Carolina); also called the Tollens solution. The Tollens solution was agitated with a stir bar while a sugar solution (dextrose, anhydrous ACS grade, EMD Millipore, Burlington, Massachusetts) was slowly added to the beaker. The Tollens and sugar solutions were permitted to react until a visual color change was seen in the beaker, indicating all the available silver nitrate has been converted to pure silver.
c. Silver Layer Adhesion Testing
The discs were tested for silver adhesion using the Silver Layer Adhesion Test described above.
Example 1 Results: No visible silver was removed by any of the testing tapes.
Comparative Example CE1 Results: A large amount of the silver was removed by the SCOTCH #600 and 3M 8403 HD adhesive tapes.

Example 2: Zirconia Scalloped Tetrahedron Particles Treated with Phosphoric Acid a. Treatment of Zirconia Scalloped Tetrahedron Particles:
Dental phosphoric acid was diluted with DI water (0.5 g dental etch gel+25.28 g DI water). The zirconia particles were placed in 20-micrometer polymeric screen material and immersed in acid for about 10 minutes while agitated by placing the screen with the particles into a bottle, closing the bottle and immersing the bottle in an ultrasonic bath. The particles were rinsed with distilled water until the blue tint from dental etch was washed off. While still wet, the particles were placed in $AgNO_3$ solution (1.23 g $AgNO_3$+ 25.52 g DI water) for about 10 min while agitated by placing into a bottle and immersing the closed bottle in and ultrasonic bath for about 10 min.
The screen with the particles was removed from the bottle and placed in a Blue-M furnace at 80° C. to dry. After drying, the particles showed a relatively even brown appearance. The dried particles were removed from the screen and placed into a porcelain crucible. The crucible was placed into the THERMOLYNE 1200 and heat treated by heating at 20° C./min to 440° C., held at 440° C. for 30 min and then naturally cooled in the furnace by turning the power off. The particle looked slightly grey after the heat treatment. Optical microscope images showed small silver droplets on the surface of the tetrahedron.

Example 3: Zirconia Disc Treatment with Potassium Phosphate a. Surface Treatment of Zirconia Disc:
1.03 g of potassium monophosphate ($KH_2PO_4$, Millipore-Sigma, St. Louis, MO, USA) was dissolved in 25.26 g distilled water. A zirconia disk was immersed in the solution for 30 seconds, lightly dried with a Kimwipe, rinsed with distilled water, and dried in a BLUE-M Box Oven at 80° C. The treated disc was treated further using the Tollens reaction.
b. Formation of a Silver Layer by the Tollens Reaction:
A conductive silver seed-layer was deposited on each surface using the Tollens reaction. The discs were submerged into an aqueous solution of 0.58 wt % silver nitrate ($AgNO_3$ crystals, RQ, Ames Goldsmith, Elkton, Maryland), 1.18 wt % ammonium hydroxide (VWR ACS grade ammonium hydroxide, 28-30%, Radnor, Pennsylvania), and 0.26 wt % potassium hydroxide (≥85% pellets, Honeywell, Charlotte, North Carolina); also called the Tollens solution. The Tollens solution was agitated with a stir bar while a sugar solution (dextrose, anhydrous ACS grade, EMD Millipore, Burlington, Massachusetts) was slowly added to the beaker. The Tollens and sugar solutions were permitted to react until a visual color change was seen in the beaker, indicating all the available silver nitrate has been converted to pure silver.
c. Silver Layer Adhesion Testing
The disc was tested for silver adhesion using the Silver Layer Adhesion Test described above.
Example 3 Results: A small amount of silver was removed by the SCOTCH #600 adhesive tape and no silver was removed by the other two adhesives.

Example 4: Zirconia Disc Treatment with Sodium Phosphate a. Surface Treatment of Zirconia Disc:
1.01 g of sodium phosphate ($NaH_2PO_4$ Millipore-Sigma, St. Louis, MO, USA) was dissolved in 25.1 g distilled water. A zirconia disk was immersed in the solution for 30 seconds, lightly dried with a Kimwipe, rinsed with distilled water, and dried in a BLUE-M Box Oven at 80° C.
b. Formation of a Silver Layer by the Tollens Reaction:
A conductive silver seed-layer was deposited on the surface using the Tollens reaction. The discs were submerged into an aqueous solution of 0.58 wt % silver nitrate ($AgNO_3$ crystals, RQ, Ames Goldsmith, Elkton, Maryland), 1.18 wt % ammonium hydroxide (VWR ACS grade ammonium hydroxide, 28-30%, Radnor, Pennsylvania), and 0.26 wt % potassium hydroxide (≥85% pellets, Honeywell, Charlotte, North Carolina); also called the Tollens solution. The Tollens solution was agitated with a stir bar while a sugar solution (dextrose, anhydrous ACS grade, EMD Millipore, Burlington, Massachusetts) was slowly added to the beaker. The Tollens and sugar solutions were permitted to react until a visual color change was seen in the beaker, indicating all the available silver nitrate has been converted to pure silver.
c. Silver Layer Adhesion Testing
The disc was tested for silver adhesion using the Silver Layer Adhesion Test described above.
Example 4 Results: No visible silver was removed by any of the three adhesives.

B. PVD Examples

Comparative Example CE2: Zirconia Disc a. Surface Treatment of Zirconia Disc:

An yttria-stabilized zirconia disc approximately 10 mm square was washed in isopropanol (IPA) and placed in a 150° C. oven overnight to remove any water on the surface. No surface treatment was carried out.

b. Formation of a Silver Layer by PVD Sputtering:

The zirconia substrate was placed in a cylindrical sputtering vacuum chamber on a specially modified plate. This plate was attached to a Keithly 247 2000 volt power supply through a BNC feedthrough in the chamber wall. The plate was insulated from the grounded chamber by a 3 in diameter×0.25 in (8 cm×0.6 cm) thick plate of PTFE (polytetrafluoroethylene). A 3 in round×0.25 in (8 cm×0.6 cm) thick Ag sputtering target (99.99% purity, Kurt J Lesker Co.) was used as the silver material source. The sputtering source was oriented at about 30 degrees normal to the substrate. The sputtering source was within about 8 inches (20 cm) of the substrate. After pumping down to a base pressure of 3.8× $10^{-6}$ Torr (ion gauge), Argon gas (99.999% ultra-high purity) was introduced to the vacuum chamber using an MKS 246 flow controller at a flow rate of 100 sccm. A manual gate valve was used as a throttle valve to maintain the process pressure of the vacuum chamber at 10 mTorr. 1.0 kilowatt was applied to the Ag sputter target for 30 seconds. The Ag-coated zirconia disk was removed from the chamber.

c. Silver Layer Adhesion Testing

The disc was tested for silver adhesion using the Silver Layer Adhesion Test described above.

Comparative Example CE2 Results: A large amount of silver is removed by the 3M 8403 HD adhesive, a small amount of silver is removed by the SCOTCH #600 adhesive, and no silver is removed by the POST-IT adhesive.

Example 5: Zirconia Disc Treatment with Phosphoric Acid a. Surface Treatment of Zirconia Disc:

An yttria-stabilized zirconia disc approximately 10 mm square was washed in isopropanol (IPA) and placed in a 150° C. oven overnight to remove any water on the surface. The disc was coated with dental phosphoric acid (SCOTCH-BOND Universal Etchant, 3M) and rinsed with deionized (DI) water after 30 seconds.

b. Formation of a Silver Layer by PVD Sputtering:

The zirconia substrate was placed in a cylindrical sputtering vacuum chamber on a specially modified plate. This plate was attached to a Keithly 247 2000 volt power supply through a BNC feedthrough in the chamber wall. The plate was insulated from the grounded chamber by a 3 in diameter×0.25 in (8 cm×0.6 cm) thick plate of PTFE (polytetrafluoroethylene). A 3 in round×0.25 in (8 cm×0.6 cm) thick Ag sputtering target (99.99% purity, Kurt J Lesker Co.) was used as the silver material source. The sputtering source was oriented at about 30 degrees normal to the substrate. The sputtering source was within about 8 inches (20 cm) of the substrate. After pumping down to a base pressure of 3.8× $10^{-6}$ Torr (ion gauge), Argon gas (99.999% ultra-high purity) was introduced to the vacuum chamber using an MKS 246 flow controller at a flow rate of 100 sccm. A manual gate valve was used as a throttle valve to maintain the process pressure of the vacuum chamber at 10 mTorr. 1.0 kilowatt was applied to the Ag sputter target for 30 seconds. The Ag-coated zirconia disk was removed from the chamber.

c. Silver Layer Adhesion Testing

The disc was tested for silver adhesion using the Silver Layer Adhesion Test described above.

Example 5 Results: No visible silver was removed by any of the three adhesives.

Example 6: Zirconia Disc Treatment with Potassium Phosphate a. Surface Treatment of Zirconia Disc:

An yttria-stabilized zirconia disc approximately 10 mm square was washed in isopropanol (IPA) and placed in a 150° C. oven overnight to remove any water on the surface. 1.03 g of potassium monophosphate ($KH_2PO_4$. Millipore-Sigma, St. Louis, MO, USA) was dissolved in 25.26 g distilled water. The zirconia disk was immersed in the solution for 30 seconds, lightly dried with a Kimwipe, rinsed with distilled water, and dried in a BLUE-M Box Oven at 80° C.

b. Formation of a Silver Layer by PVD Sputtering:

The zirconia substrate was placed in a cylindrical sputtering vacuum chamber on a specially modified plate. This plate was attached to a Keithly 247 2000 volt power supply through a BNC feedthrough in the chamber wall. The plate was insulated from the grounded chamber by a 3 in diameter×0.25 in (8 cm×0.6 cm) thick plate of PTFE (polytetrafluoroethylene). A 3 in round×0.25 in (8 cm×0.6 cm) thick Ag sputtering target (99.99% purity, Kurt J Lesker Co.) was used as the silver material source. The sputtering source was oriented at about 30 degrees normal to the substrate. The sputtering source was within about 8 inches (20 cm) of the substrate. After pumping down to a base pressure of 3.8× $10^{-6}$ Torr (ion gauge), Argon gas (99.999% ultra-high purity) was introduced to the vacuum chamber using an MKS 246 flow controller at a flow rate of 100 sccm. A manual gate valve was used as a throttle valve to maintain the process pressure of the vacuum chamber at 10 mTorr. 1.0 kilowatt was applied to the Ag sputter target for 30 seconds. The Ag-coated zirconia disk was removed from the chamber.

c. Silver Layer Adhesion Testing

The disc was tested for silver adhesion using the Silver Layer Adhesion Test described above.

Example 6 Results: Small amounts of silver can be seen on the 3M 8403 HD adhesive after removal. No silver was removed by the other two adhesives.

Example 7: Zirconia Disc Treatment with Sodium Phosphate a. Surface Treatment of Zirconia Disc:

An yttria-stabilized zirconia disc approximately 10 mm square was washed in isopropanol (IPA) and placed in a 150° C. oven overnight to remove any water on the surface. 1.01 g of sodium phosphate ($NaH_2PO_4$ Millipore-Sigma, St. Louis, MO, USA) was dissolved in 25.1 g distilled water. The zirconia disk was immersed in the solution for 30 seconds, lightly dried with a Kimwipe, rinsed with distilled water, and dried in a BLUE-M Box Oven at 80° C.

b. Formation of a Silver Layer by PVD Sputtering:

The zirconia substrate was placed in a cylindrical sputtering vacuum chamber on a specially modified plate. This plate was attached to a Keithly 247 2000 volt power supply through a BNC feedthrough in the chamber wall. The plate was insulated from the grounded chamber by a 3 in diameter×0.25 in (8 cm×0.6 cm) thick plate of PTFE (polytetrafluoroethylene). A 3 in round×0.25 in (8 cm×0.6 cm) thick Ag sputtering target (99.99% purity, Kurt J Lesker Co.) was used as the silver material source. The sputtering source was oriented at about 30 degrees normal to the substrate. The sputtering source was within about 8 inches (20 cm) of the substrate. After pumping down to a base pressure of 3.8× $10^{-6}$ Torr (ion gauge), Argon gas (99.999% ultra-high purity) was introduced to the vacuum chamber using an MKS 246 flow controller at a flow rate of 100 sccm. A manual gate valve was used as a throttle valve to maintain the process pressure of the vacuum chamber at 10 mTorr. 1.0 kilowatt was applied to the Ag sputter target for 30 seconds. The Ag-coated zirconia disk was removed from the chamber.

c. Silver Layer Adhesion Testing

The disc was tested for silver adhesion using the Silver Layer Adhesion Test described above.

Example 7 Results: A large amount of silver was removed by the Scotch #600 adhesive. No silver was removed by the other two adhesives.

What is claimed is:

1. An electrode, comprising:
   a zirconia-containing article comprising:
   at least one major surface comprising a phosphate surface-treated surface, wherein the phosphate surface-treated surface is formed by a phosphate salt solution;
   at least one non-porous ceramic particle having a compression strength greater than 400 megapascals and comprising at least one shaped zirconia-containing particle; and
   a layer of metal covering at least a portion of the phosphate surface-treated surface, wherein the layer of metal covering adheres more strongly to the phosphate surface-treated surface than to an untreated surface.

2. The electrode of claim 1, wherein the at least one shaped zirconia-containing particle comprises at least one point.

3. The electrode of claim 2, wherein at least one dimension of the at least one shaped zirconia-containing particle is 175 to 1,500 micrometers.

4. The electrode of claim 1, wherein the layer of metal covering comprises a metal selected from the group consisting of silver, copper, zinc, gold, aluminum, iron, nickel, and alloys thereof.

5. The electrode of claim 1, wherein the layer of metal covering has a thickness of 20 nanometers to 2 micrometers.

6. The electrode of claim 1, wherein the layer of metal covering is electrically conductive.

7. A method of preparing an electrode, the method comprising:
   providing a zirconia-containing article comprising:
   at least one major surface;
   at least one non-porous ceramic particle having a compression strength greater than 400 megapascals and comprising at least one shaped zirconia-containing particle;
   surface treating at least a portion of the at least one major surface of the zirconia-containing article with a phosphate salt solution to generate a phosphate-treated surface; and
   disposing a layer of metal on at least a portion of the phosphate-treated surface.

8. The method of claim 7, wherein the layer of metal comprises a metal selected from the group consisting of silver, copper, zinc, gold, aluminum, iron, nickel and alloys thereof.

9. The method of claim 7, wherein disposing the layer of metal on at least a portion of the at least one major surface comprises disposing a metal from a metal solution by a chemical reduction reaction.

10. The method of claim 9, wherein the metal comprises silver, and the silver from the metal solution comprises inducing a Tollens reaction.

11. The method of claim 9, wherein the metal comprises silver, and the silver from the metal solution comprises inducing a thermal reduction process.

12. The method of claim 7, wherein disposing the layer of metal comprises using a process selected from the group consisting of sputtering or evaporative deposition.

13. The method of claim 7, wherein the zirconia-containing article comprises non-compressive shaped zirconia-containing particles.

14. The method of claim 13, wherein the non-compressive shaped zirconia-containing particles comprise at least one point.

15. The method of claim 14, wherein at least one dimension of the non-compressive shaped zirconia-containing particles is 175 to 1,500 micrometers.

16. The method of claim 7, wherein the layer of metal is electrically conductive.

* * * * *